United States Patent [19]

DuBrueler, Jr.

[11] 3,946,900

[45] Mar. 30, 1976

[54] AUTOMATIC LIQUID DISPENSING SYSTEM

[76] Inventor: Ralph DuBrueler, Jr., 801 N. Pitt St., Apt. 1508, Alexandria, Va. 22314

[22] Filed: Oct. 23, 1973

[21] Appl. No.: 408,502

[52] U.S. Cl. .................. 222/20; 137/805; 141/128; 222/25

[51] Int. Cl.² .............................................. G01F 1/08

[58] Field of Search .............. 194/13; 222/2, 14, 15, 222/16, 17, 18, 19, 20, 25, 26, 27, 28; 141/128 X; 137/805 X; 235/201 FS, 201 R

[56] References Cited

UNITED STATES PATENTS

| | | | |
|---|---|---|---|
| 3,053,414 | 9/1962 | Rapisarda | 222/20 |
| 3,254,795 | 6/1966 | Mackie | 222/20 |
| 3,353,710 | 11/1967 | Romanowski | 222/20 X |
| 3,520,338 | 7/1970 | Vest et al. | 141/128 |
| 3,627,175 | 12/1971 | Hisada | 222/14 |
| 3,651,989 | 3/1972 | Westrich | 222/17 |
| 3,771,697 | 11/1973 | Sasnett | 222/16 |

*Primary Examiner*—Drayton E. Hoffman
*Assistant Examiner*—Larry H. Martin

[57] ABSTRACT

A system for dispensing a selected amount of liquid from apparatus such as a service station gasoline pump. Low pressure air is directed through air passages in response to valve means carried by the pump indicator dials. The amount desired to be dispensed is entered into the system through a selector valve means, which allows air to actuate the hose nozzle automatic cut-off device when the desired amount, or an amount slightly less than the desired amount, has been dispensed.

9 Claims, 4 Drawing Figures

AUTOMATIC LIQUID DISPENSING SYSTEM

BACKGROUND OF THE INVENTION

This invention relates generally to automatic liquid dispensing apparatus, and more particularly to apparatus for automatically dispensing a desired amount of gasoline from a service station gasoline pump.

Owing to the increased cost of gasoline and the difficulty in obtaining competent labor for operating service stations, there has developed an interest in providing fully or semi-automatic gasoline pumping systems that can easily be operated by the customer, or a number of which can simultaneously be operated by a single attendant. For a number of years it has been common to equip gasoline pumps with hose nozzles having means for sensing a full tank in the vehicle and shutting off in response thereto. However, large numbers of customers still prefer to purchase gasoline in specific dollar or gallon amounts, and the aforementioned automatic cut-off pumps are of no benefit in such cases.

The emphasis has thereby turned to automatic pumps which respond to a selected quantity of gasoline, indicated in dollars or gallons. The prior art is replete with many such systems, but they have for the most part been complex, costly, and unreliable. Many utilize complicated electrical systems, which are undesirable on a gasoline pump from the standpoint of maintenance and fire safety. Others have been pneumatically operated, but they have been complex, also. If a system is unreliable and cannot be trusted by the operator, it is less useful than a completely manual system. High maintenance costs cannot be tolerated in the service station business. Finally, the prior art systems cannot easily be installed in existing gasoline pumping systems, and therefore to place them into service would involve a complete equipment change-over at the service station level, which would be a very costly undertaking.

SUMMARY OF THE INVENTION

It is the primary object of this invention to provide an automatic liquid pumping system that is simple and reliable, and which eliminates the deficiencies present in the prior art devices. A further object is to provide an automatic liquid pumping system that can easily be installed in most existing gasoline service station pumping systems. Another object is to provide an automatic liquid pumping system that utilizes low pressure air for sensing and operation.

While this invention is of particular advantage in dispensing gasoline to customers at service stations, its teachings are equally well applicable to other liquid dispensing systems, such as those used in bulk deliveries of petroleum and chemical products to homes and businesses.

The basic elements of this invention are an air supply system, means for selecting the amount of liquid to be dispensed, means sensing the amount of liquid being dispensed, and pumping system cut-off means. The air pressure for operating the apparatus can be supplied by the usual air supply systems found in service stations. The selector means comprises an air valve having multiple inlet passages that can selectively be aligned with a single discharge passage, which is connected to the hose nozzle cut-off mechanism normally used to halt the flow of liquid when the receiving tank is filled. The means for sensing the amount of liquid that has been pumped makes use of the cylindrical indicating dials that display the cost and the gallons continuously as liquid is pumped. Valve means carried by these dials selectively couple the selector valve inlet air passages with an air supply manifold. When the selected amount has been reached, air flows through the system to trigger the cut-off nozzle.

An additional feature is provided which cuts off the flow of liquid slightly before the desired amount is reached. The final small amount is then dispensed manually. This is quite desirable, for it eliminates the criticality of adjustment that would otherwise constantly be necessary in order to maintain the required accuracy.

DESCRIPTION OF THE PREFERRED EMBODIMENT

Figure 1:
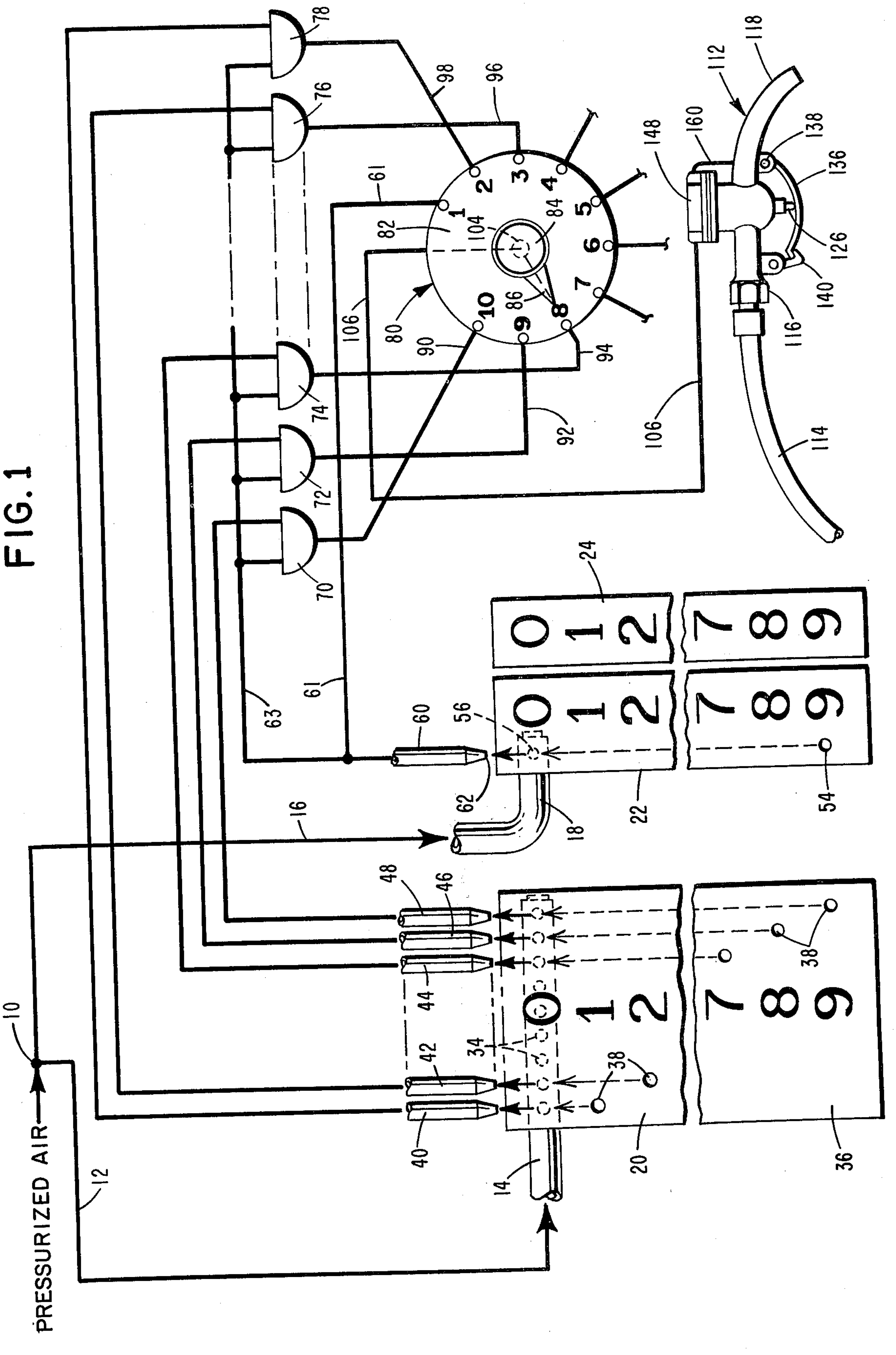
FIG. 1 is a schematic representation of a service station gasoline dispensing system in accordance with the teachings of this invention.

The components of this invention are illustrated in schematic form in FIG. 1. The system is operated by low pressure air, compressed to about 4 psig., and delivered from any air source, but advantageously by means of a low pressure bleed from the high pressure air systems that are commonly installed in service stations. Low pressure air is supplied through a primary supply conduit 12 to a primary supply manifold 14, and via a secondary supply conduit 16 to a secondary supply manifold 18.

Service station gasoline pumps have a set of cost indicating dials and a set of volume indicating dials. Generally, these are in the form of cylinders having the numerals on the outside, rotatable past a window in the face of the pump housing. At least three cost cylinders are used, one for dollars and two for cents, and three volume dials, two for gallons and one for tenths of gallons. While either of these sets can be used in conjunction with this invention, the invention is illustrated with the cost dials. In FIG. 1, the three cost cylinders have been unrolled to a flat presentation, to enable the features of the invention to be more easily understood. The dollar indicator is designated by the number 20, the tens by 22, and the units of cents by 24.

Figure 2:
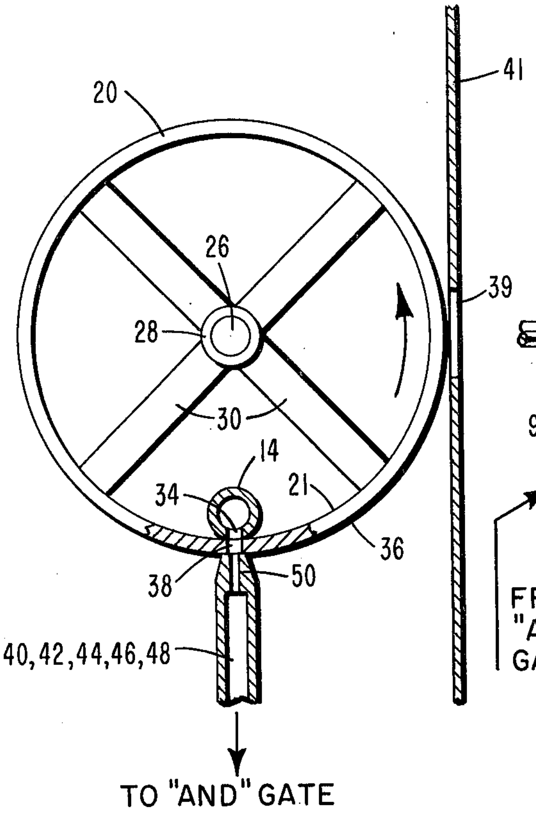
FIG. 2 is a side view, partially in section, of a common pump indicating dial modified in accordance with this invention.

Primary air supply manifold 14 is installed inside of the cylindrical dollars indicator 20, in juxtaposition to the inside surface 21 thereof (see FIG. 2), in a manner so as not to interfere with the rotation of the indicator. Generally, the indicators are open-ended cylinders, supported for rotation on a shaft 26 by a hub 28 and a plurality of struts 30 attached along one edge of the cylinder 20, so that manifold 14 can simply extend inwardly from the opposite side. Spaced along manifold 14 are a plurality of manifold outlets 34, which are immediately adjacent to the inside surface 21, and are substantially closed by inside surface 21, although a sealing relationship is not necessary.

Dollars indicator 20 has imprinted upon its outside surface 36 the numerals 1 through 9. Associated with each numeral is a valve opening 38. These valve openings 38 are staggered across the face of dollar indicator 20 in alignment with the outlets 34 of main air supply manifold 14. For simplicity in explaining the invention each valve opening 38 is illustrated as being aligned with the dollar figure that it represents. However, in an actual installation, it would probably be offset therefrom, because the numerals appear in a window 39 in the face 41 of the pump (see FIG. 2) and the manifold 14 would probably have to be offset from window 39.

A plurality of air passages 40, 42, 44, 46 and 48 are located on the outside of dollars indicator 20, with their open ends 50 immediately adjacent to outside surface 36, and in alignment with outlets 34. While only five of the passages have been shown, it should be understood that there is one passage for each numeral.

Tens of cents indicator 22 is constructed identically to the above described dollar indicator 20. However, only one valve opening 54 is present in tens indicator 22, and it is associated with the number 9, which would indicate ninety cents. Secondary air supply manifold 18 has only a single outlet 56 aligned with valve opening 54. A single air passage 60 has its open end 62 also aligned with outlet 56. Air passage 60 splits into two passages 61 and 63. Passage 61 leads directly to the selector unit, described below, and passage 63 leads to each of the AND gates, in a manner also described below. Units of cents indicator 24 has no valve openings.

Air passages 40–48 lead to AND gates 70, 72, 74, 76, and 78 respectively. AND gates 70–78 are of the conventional type, in which the appearance of two fluid inputs results in a single working fluid output.

Figure 3:
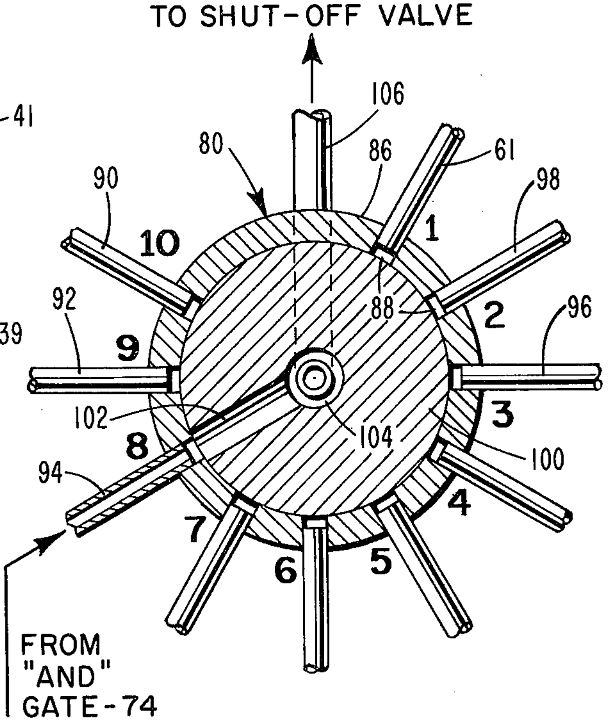
FIG. 3 is a front view, partially in section, of the selector valve of this invention.

The amount of liquid desired to be dispensed is entered into the system by means of a selector unit 80, which has a face 82 upon which the amounts are inscribed and a selector handle 84 having a pointer 86. The internal structure of selector unit 80 is shown in FIG. 3. A cylindrical housing 86 has a plurality of air inlet ports 88 spaced around the circumference thereof. Connected to each of these ports 88 is a valve inlet conduit from the outlet side of one of the AND gates. For purposes of explanation only the valve inlet passages 90, 92, 94, 96 and 98 are shown, corresponding to the illustrated AND gates 70–78. A valve disc 100 is rotatably mounted within housing 86, and has a radial valve passage 102, which communicates with a central valve chamber 104. Valve disc 100 is attached to handle 84 and rotates therewith. Communicating with central chamber 104 is a valve outlet conduit 106, that leads to the automatic cut-off mechanism.

Figure 4:
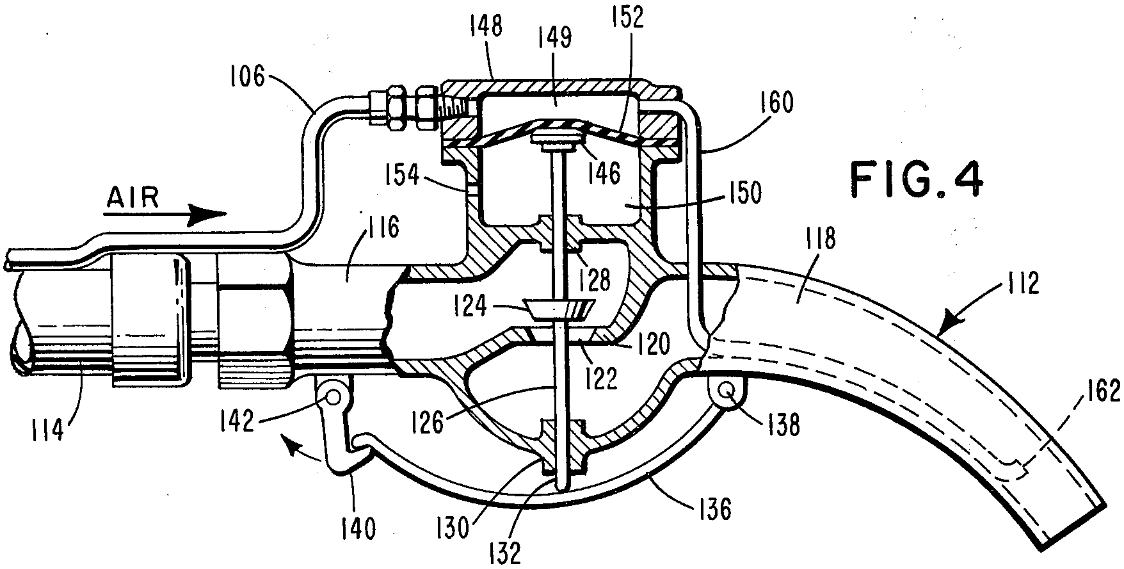
FIG. 4 is a side view, partially in section, of a common automatic cut-off nozzle that can be used with this invention.

The system of this invention can interface with any of the commonly used types of full tank automatic hose nozzle shut-off devices which operate on air pressure. A simplified showing of such a nozzle 112 is shown in FIG. 4. The hose 114 from the gasoline pump (not shown) connects to a nozzle inlet portion 116, which is separated from a nozzle outlet portion 118 by a partition 120. A valve seat 122 is in partition 120. A valve 124 is mounted on an actuating rod 126 which is slidably mounted in bearings 128 and 130, and which has a portion 132 extending out of the nozzle 112. An operating lever 136 is pivotally attached to nozzle 112 by a pin connection 138. Lever 136 is engagable with rod portion 132. A hook 140 is also pivotally attached to nozzle 112 by a pivot connection 142, and is engagable with lever 136. Rod 126 terminates at its upper end in a flange 146. The angle of engagement between hook 140 and lever 136 is such that downward pressure by rod 126 will cause lever 136 to disengage from hook 140.

A housing 148 is divided by a resiliant diaphram 152 into two chambers 148 and 150. Rod 126 extends into chamber 150 with flange 146 bearing upon diaphram 152. An opening 154 vents chamber 150 to atmosphere. Valve outlet conduit 106 communicates with chamber 148. A nozzle pressure sensing line 160 terminates in a nozzle 162, to sense the presence of a full tank in the vehicle, in a well-known manner. Line 160 also communicates with chamber 148.

The operation of this system is as follows: For example, a customer desires to purchase eight dollars worth of gasoline. The system will cut off the flow when seven dollars and ninety cents worth of gasoline has been dispensed. Dial 84 is rotated to the numeral eight position shown in FIG. 1. Valve passage 102 is thus rotated to the position shown in FIG. 3, in alignment with valve inlet conduit 94. Nozzle 112 is placed in the vehicle gasoline tank filler pipe (not shown), and lever 136 placed in the position shown in FIG. 4, locked by hook 140. This action moves rod 126 upwardly, unseating valve 124 and deforming diaphram 152 upwardly.

Gasoline now begins to flow through hose 114 and nozzle 112, in the normal manner. Dials 20, 22 and 24 begin to rotate, in the normal manner. When the sum of ninety cents is reached, valve opening 54 will have moved into alignment between manifold opening 56 and inlet 62, thus allowing a burst of air to be communicated to valve inlet conduit 60, and thence through line 61 to the valve inlet ports 88 that corresponds to the one dollar figure, and through line 63 to one inlet of each of the AND gates 70–78. Since valve passage 102 is not aligned with the one dollar valve inlet port 88, the system does not operate. If, however, the amount of one dollar had been selected, the nozzle cut-off would now have functioned, as explained below. Likewise, none of the AND gates 70–78 operate, for only one inlet to each is pressurized by line 63. Succeeding passings of the ninety cent figure will cause additional momentary pressurizations of lines 61 and 63.

Next, the first of the valve openings 38, corresponding to one dollar, will move into alignment between a manifold opening 34 and air conduit 40. Such alignment will cause one inlet to AND gate 70 to be pressurized for so long as the one dollar figure appears in window 39. When the ninety cent valve opening 54 now moves into alignment with manifold outlet 56 and line 60, a burst of pressurized air flows through line 63 to the second inlet of AND gate 70, causing AND gate 70 to operate. This pressurizes valve inlet line 90, corresponding to the amount of two dollars. However, valve passage 102 is not aligned with valve inlet line 90, so the cut-off system is not operated. The above functions are repeated as each dollar figure, up to six, is presented at window 39.

The target of the system is the figure of seven dollars and ninety cents. With this in mind, when the valve opening 38 corresponding to seven dollars moves into alignment, line 44 is pressurized, thus pressurizing one input to AND gate 74. When the ninety cent valve opening 54 moves into alignment, line 63 is again pressurized, thus presenting the second input to AND gate 74, which then operates, allowing pressurized air to flow through valve inlet line 94. Since valve passage 102 is aligned with line 94, the pressure is communicated through selector valve 80 to valve outlet line 106, and thence to chamber 148 of nozzle 112. The pressure in chamber 148 acts upon diaphram 152, causing rod 126 to move downwardly. This action cams spring lever 136 loose from hook 140, to close valve 124, stopping the liquid flow at seven dollars and ninety cents.

The above description is of the operation of the inventive apparatus in its most complex form, that is, shutting off the flow of liquid at a predetermined point in advance of the arrival at the selected amount. It should be understood that the apparatus can be operated in such a manner as to shut off the flow exactly at the selected amount. Also, the above described arrangement could be utilized with the volume (gallons) indicators, rather than the cost indicators.

The apparatus of this invention can easily be added to most existing service station gasoline pumps. It is safe, reliable and accurate. It does not interfere with any of the other sub-systems commonly used with the pump. It enables a single service station attendant to oversee the operation of a number of simultaneously operating gasoline pumps without worrying about overrunning the amounts desired by the various customers.

Many variations and modifications of the above described preferred embodiment of the invention may become apparent to those skilled in the art. However, it should be understood that the invention is not limited to the embodiment described above, but only by the scope of the appended claims.

I claim:

1. A liquid dispensing system comprising:

liquid cut-off valve means for a liquid dispensing line movable by gas pressure from a dispensing position to a cut-off position, selector valve means for entering into the system the desired amount of liquid to be dispensed, said selector valve means comprising a valve body having a plurality of valve inlet ports, a valve outlet port, and a valve element for connecting together a selected one of said valve inlet ports with said valve outlet port, each of said valve inlet ports representing a specific amount of liquid to be dispensed, a plurality of gas supply ports for communicating with a source of pressurized gas, each said gas supply port representing an amount of liquid dispensed, a plurality of gas supply passages connectable at one end to respective ones of said valve inlet ports and terminating at their other ends adjacent to said gas supply ports, supply valve means interposed between each of said gas supply passages and its respective said gas supply port for selectively placing one said gas supply passage in communication with its respective said gas supply port, indicator means for indicating the amount of liquid dispensed, said indicator means being operatively interconnected with said supply valve means to operate said supply valve means in response to the amount of liquid dispensed, whereby when said indicator means indicates that the selected amount of liquid has been dispensed, pressurized gas can flow through the said gas supply port, the said gas supply passage, and the said valve inlet port representing the selected amount, and thereafter through said valve outlet port to operate said liquid cut-off valve.

2. The system of claim 1 wherein said gas supply ports and said other ends of said gas supply passages are aligned with and slightly spaced from one another, and wherein supply valve means comprises a movable valve plate having a plurality of staggered valve openings therethrough, alignable with said gas supply ports, said valve being plate being interposed between said gas supply ports and said other ends of said gas supply passages.

3. The system of claim 1 wherein said gas supply ports and said other ends of said gas supply passages are aligned with and slightly spaced from one another, and wherein indicator means comprises a rotatable cylindrical drum having numerals on the face thereof, the side of said cylindrical drum passing between said gas supply ports and said other ends of said gas supply passages, and wherein said supply valve means a plurality of staggered openings in the side of said cylindrical drum.

4. The system of claim 1 wherein said indicator means comprises a first indicator for indicating units and a second indicator for indicating portions of said units, said first indicator being operatively interconnected with said supply valve means, and wherein said system further comprises a plurality of gas operated AND gates, each having two gate inlets and one gate outlet, one of said AND gates being interposed in each said gas supply passage such that said gas supply passage is connected to one said gate inlet and to said gate outlet, a secondary gas supply passage connected to the other gate inlet of each of said AND gates and terminating in an end adjacent to an auxiliary gas supply port, auxiliary supply valve means interposed between said auxiliary gas supply passage and said auxiliary gas supply port, said auxiliary valve means being operatively interconnected with said second indicator.

5. In a liquid dispensing system having first and second indicators for indicating the amount of liquid dispensed in units and portions of units, respectively, and a liquid cut-off valve for a liquid dispensing line operated by fluid pressure, the improvement comprising:

selector valve means for entering into the system the desired amount of liquid to be dispensed, said selector valve means having a plurality of gas inlet ports each labeled with a particular magnitude of units indicated on said first indicator, a gas outlet port connected to said cut-off valve, and a valve element for connecting together said gas outlet port and the said gas inlet port labeled with the desired amount of liquid to be dispensed, a plurality of gas operated AND gates each representing a particular magnitude of units indicated on said first indicator, each said AND gate having a gate outlet connected to the said valve inlet port labeled with the magnitude of units one greater than the said AND gate, said AND gate further having a pair of gate inlets, a plurality of first gas supply ports, each said port representing a number of units indicated on said first indicator, a plurality of gas supply passages each having one end connectable with one of said gas supply ports, each of said gas supply passages having the other end connected to one said gate inlet, first supply valve means interposed between said gas supply ports and said gas supply passages, said first supply valve means being operated by said first indicator for selectively connecting to one another the said gas supply port and the said gas supply passage representing the number of units being indicated by said first indicator, a second gas supply port representing a particular portion of said units indicated on said second indicator, a second gas supply passage having one end connectable with said second gas supply port and the other end communicating with the other said gate inlet of each of said AND gates, second supply valve means interposed between said second gas supply port and said one of said second gas passage, second supply valve means being operated by said second indicator for connecting said second gas supply port and said second gas passage to one another when said particular portion of said units is indicated on said second indicator, whereby when said first indicator indicates the selected magnitude of units less one unit, and said second indicator indicates said particular portion of said units, pressurized gas flows through the said AND gate representing said one unit less than the selected magnitude of units, through said selector valve, and thence to said cut-off valve to operate said cut-off valve.

6. The system of claim 5 wherein said first gas supply ports and said one ends of said gas supply passages are aligned with and slightly spaced from one another, and wherein said first indicator comprises a cylindrical drum having a first side passing between said first gas supply ports and said one ends of said first gas passages and said first valve means comprises a plurality of first valve openings staggered around said first side and alignable with said first gas supply ports by rotation of said first drum, and wherein said second gas supply port and said one end of said second gas supply passage are aligned with and slightly spaced from one another, and wherein said second indicator comprises a second cylindrical drum having a second side passing between said second gas supply port and said one end of said second gas supply passage and said second valve means comprises a second valve opening in said second side and alignable with said second gas supply port by rotation of said second drum.

7. The system of claim 5 wherein said first indicator shows the amount of liquid dispensed in dollars said second indicator shows the amount of liquid dispensed in cents and said selector valve ports are labeled in dollar amounts.

8. The system of claim 5 wherein said first indicator shows the amount of liquid dispensed in gallons, said second indicator shows the amount of liquid dispensed in tenths of gallons, and said selector valve ports are labeled in gallon amounts.

9. In a liquid dispensing system having first and second indicators for indicating the amount of liquid dispensed in units and portions of units, respectively, and a liquid cut-off valve for a liquid dispensing line, the improvement comprising;

selector valve means settable to a selected amount of liquid to be dispensed, said selector valve means operating said cut-off valve upon receipt of first and second signals, first signal means operated by said first indicator and generating a first signal in the form of fluid pressure to said selector means when one unit less than said selected amount of liquid has been dispensed, and second signal means operated by said second indicator and generating a second signal in the form of fluid pressure to said selector means when a predetermined portion of a unit has been dispensed, said cut-off valve means being responsive to said first and second signals to halt the dispensing of liquid when an amount slightly less than the selected amount has been dispensed, said selecting valve means delivering said first and second signals to said cut-off means.

* * * * *